(12) United States Patent
Li et al.

(10) Patent No.: US 9,623,408 B2
(45) Date of Patent: Apr. 18, 2017

(54) MICROFLUIDICS SEPARATION METHOD AND SYSTEM THEREOF

(71) Applicant: University of Macau, Macau (MO)

(72) Inventors: Cheuk-Wing Li, Hong Kong (HK); Ming Yuen Lee, Macau (MO); Guodong Yu, Macau (MO); Jingyun Jiang, Macau (MO)

(73) Assignee: University of Macau, Macau (CN)

( * ) Notice: Subject to any disclaimer, the term of this patent is extended or adjusted under 35 U.S.C. 154(b) by 246 days.

(21) Appl. No.: 14/512,466

(22) Filed: Oct. 13, 2014

(65) Prior Publication Data

US 2016/0101419 A1    Apr. 14, 2016

(51) Int. Cl.
*G01N 1/18* (2006.01)
*B01L 3/00* (2006.01)
*B01D 11/04* (2006.01)

(52) U.S. Cl.
CPC .... *B01L 3/502753* (2013.01); *B01D 11/0496* (2013.01); *B01L 3/502776* (2013.01); *B01L 2300/0806* (2013.01); *B01L 2300/087* (2013.01); *B01L 2300/0864* (2013.01); *B01L 2300/0867* (2013.01); *B01L 2300/0874* (2013.01)

(58) Field of Classification Search
None
See application file for complete search history.

(56) References Cited

PUBLICATIONS

M. Yamada, J. Kobayashi, M. Yamato, M. Seki and T. Okano, Lab on a chip, 2008, 8, 772-778. A. A. Waheed and P. D. Gupta, J. Biochem. Biophys. Methods, 2000, 42, 125-132.
S. Nagrath, L. V. Sequist, S. Maheswaran, D. W. Bell, D. Irimia, L. Ulkus, M. R. Smith, E. L. Kwak, S. Digumarthy, A. Muzikansky, P. Ryan, U. J. Balis, R. G. Tompkins, D. A. Haber and M. Toner, Nature, 2007, 450, 1235-1239.
S. Wang, K. Liu, J. Liu, Z. T. Yu, X. Xu, L. Zhao, T. Lee, E. K. Lee, J. Reiss, Y. K. Lee, L. W. Chung, J. Huang, M. Rettig, D. Seligson, K. N. Duraiswamy, C. K. Shen and H. R. Tseng, Angew Chem Int Ed Engl, 2011, 50, 3084-3088.
H. Zhang, L. Liu, C. W. Li, H. Y. Fu, Y. Chen and M. S. Yang, Biosens. Bioelectron., 2011, 29, 89-96.
W. Q. Yue, H. Zou, Q. H. Jin, C. W. Li, T. Xu, H. Y. Fu, L. C. H. Tzang, H. Y. Sun, J. L. Zhao and M. S. Yang, Biosens. Bioelectron., 2014, 54, 297-305.

(Continued)

*Primary Examiner* — Robert Xu
(74) *Attorney, Agent, or Firm* — Eagle IP Limited; Jacqueline C. Lui

(57) ABSTRACT

A microfluidic system for separating an analyte from a sample fluid including a series of fluidic channels including at least one first region and at least one second region. The first region includes a plurality of L-nodes, which connects to each other in series. The second region includes a plurality of R-nodes, which connects to each other in series. The first region is configured to trigger at least about one lamination process cycle for both the sample fluid and the buffer fluid and the second region is configured to trigger at least about one reverse lamination process cycle for both the sample fluid and the buffer fluid, whereby the lamination process cycle and the reverse lamination process cycle causes the analyte to diffuse to the buffer fluid from the sample fluid. A method for separating the analyte is also disclosed.

11 Claims, 14 Drawing Sheets

(56) References Cited

PUBLICATIONS

J. A. Davis, D. W. Inglis, K. J. Morton, D. A. Lawrence, L. R. Huang, S. Y. Chou, J. C. Sturm and R. H. Austin, Proceedings of the National Academy of Sciences of the United States of America, 2006, 103, 14779-14784.
H. Amini, E. Sollier, M. Masaeli, Y. Xie, B. Ganapathysubramanian, H. A. Stone and D. Di Carlo, Nature communications, 2013, 4, 1826.
C.—W. Li and M. Yang, Lab on a chip, 2007, 7, 1712-1716.
R. F. Ismagilov, D. Rosmarin, P. J. A. Kenis, D. T. Chiu, W. Zhang, H. A. Stone and G. M. Whitesides, Analytical chemistry, 2001, 73, 4682-4687.
H. M. Xia, S. Y. Wan, C. Shu and Y. T. Chew, Lab on a chip, 2005, 5, 748-755.
D. Lee and P. H. Lo, Chemical Engineering Journal, 2012, 181, 524-529.
H. Chen and J.—C. Meiners, Applied Physics Letters, 2004, 84, 2193.
M. Kuhn, M. Campillos, P. Gonzalez, L. J. Jensen and P. Bork, FEBS Lett., 2008, 582, 1283-1290.
G. W. Mihaly, M. S. Ching, M. B. Klejn, J. Paull and R. A. Smallwood, Brit J Clin Pharmaco, 1987, 24, 769-774.
Y. Z. Zhang and H. Gomer, Photochem. Photobiol., 2009, 85, 677-685.
D. Gao, Y. Tian, F. Liang, D. Jin, Y. Chen, H. Zhang and A. Yu, J. Lumin., 2007, 127, 515-522.
N. J. Waters, R. Jones, G. Williams and B. Sohal, J. Pharm. Sci., 2008, 97, 4586-4595.
B. Huang, H. Wu, S. Kim and R. N. Zare, Lab on a chip, 2005, 5, 1005-1007.
C.—W. Li, C. N. Cheung, J. Yang, C. H. Tzang and M. Yang, The Analyst, 2003, 128, 1137.
C.—W. Li, R. Chen and M. Yang, Lab Chip, 2007, 7, 1371-1373.
W. Q. Yue, C. W. Li, T. Xu and M. S. Yang, Lab Chip, 2011, 11, 3352-3355.
Y. Luo, F. Yu and R. N. Zare, Lab on a chip, 2008, 8, 694-700.
H. Wu, B. Huang and R. N. Zare, Lab on a chip, 2005, 5, 1393-1398.
C. W. Li, J. Yang and M. S. Yang, Lab on a chip, 2006, 6, 921-929.
K. P. Nichols, J. R. Ferullo and A. J. Baeumner, Lab on a chip, 2006, 6, 242-246.
A. D. Stroock, S. K. W. Dertinger, A. Ajdari, I. Mezic, H. A. Stone and G. M. Whitesides, Science, 2002, 295, 647-651.
B. H. Weigl and P. Yager, Science, 1999, 283, 346-347.
N. Muramatsu and A. P. Minton, Proceedings of the National Academy of Sciences of the United States of America, 1988, 85, 2984-2988.
P. O. Gendron, F. Avaltroni and K. J. Wilkinson, Journal of fluorescence, 2008, 18, 1093-1101.
P. W. Atkins, Physical Chemistry, Oxford University Press, UK, 1994.
S. Yang, A. Undar and J. D. Zahn, Lab on a chip, 2006, 6, 871-880.
T. O. Peulen and K. J. Wilkinson, Environ Sci Technol, 2011, 45, 3367-3373.
Y. N. Du, M. J. Hancock, J. K. He, J. L. Villa-Uribe, B. Wang, D. M. Cropek and A. Khademhosseini, Biomaterials, 2010, 31, 2686-2694.
M. Yang, C. W. Li and J. Yang, Anal. Chem., 2002, 74, 3991-4001.
T. Xu, W. Q. Yue, C. W. Li, X. S. Yao, G. P. Cai and M. S. Yang, Lab Chip, 2010, 10, 2271-2278.
Y. Ni, Q. Liu and S. Kokot, Spectrochim. Acta, Part A, 2011, 78, 443-448.
A. A. Waheed and P. D. Gupta, J. Biochem. Biophys. Methods,2000, 42, 125-132.
D. V. McCalley, Journal of Chromatography A, 2002, 965, 51-64.
K. Toyama, M. Yamada and M. Seki, Biomedical microdevices, 2012, 14, 751-757.

MICROFLUIDICS SEPARATION METHOD AND SYSTEM THEREOF

FIELD OF INVENTION

The present invention relates to microfluidics and in particular to a microfluidic separation method and system thereof.

BACKGROUND OF INVENTION

In microfluidics, many unique functions are achieved by controlling the movement of fluid streams within microchannels. To name a few, streamline control aids in sample preparation of cells, on-chip purification of nuclei from cells, capturing of circulating tumor cells, and separation of particles and blood cells.

Separation of molecules from a fluid in microfluidics can be achieved by using a filter with appropriate pore-size. However, the use of filter for separation may be undesirable in certain situation due to the tendency of filter clogging, which may result in low-yield.

SUMMARY OF INVENTION

In the light of the foregoing background, it is an object of the present invention to provide an alternative microfluidic separation method and system thereof.

Accordingly, the present invention, in one aspect, is a microfluidic system for separating an analyte from a sample fluid including (a) a series of fluidic channels including at least one first region and at least one second region; (b) a sample inlet portion connected to a first end of the series of fluidic channels, wherein the sample inlet portion is configured to receive the sample fluid including the analyte; (c) a buffer inlet portion connected to the first end of the series of fluidic channels, wherein the buffer inlet portion is configured to receive a buffer fluid; (d) a recovery outlet portion connected to a second end of the series of fluidic channels; and (e) a waste outlet portion connected to the second end of the series of fluidic channels. The first region includes a plurality of L-nodes, which connects to each other in series. The second region includes a plurality of R-nodes, which connects to each other in series. The first region is configured to trigger at least about one lamination process cycle for both the sample fluid and the buffer fluid and the second region is configured to trigger at least about one reverse lamination process cycle for both the sample fluid and the buffer fluid, whereby the lamination process cycle and the reverse lamination process cycle causes the analyte to diffuse to the buffer fluid from the sample fluid. The recovery outlet portion is configured to transfer the analyte and the buffer fluid from the microfluidic system for collection.

In one exemplary embodiment, the first region is directly connected to the second region; wherein the first region is configured to trigger about one lamination process cycle for both the sample fluid and the buffer fluid; and wherein the second region is configured to trigger about one reverse lamination process cycle for both the sample fluid and the buffer fluid.

In another embodiment, the first region is connected to both the sample inlet portion and the buffer inlet portion; and wherein the second region is connected to both the recovery outlet portion and the waste outlet portion.

In yet another embodiment, each of the L-nodes has a L-node upper channel and a L-node lower channel; and each of the R-nodes has a R-node upper channel and a R-node lower channel, wherein each of the L-node upper channels, L-node lower channels, R-node upper channels and R-node lower channels has an aspect ratio in a range of 0.1-0.35.

In another aspect, the present invention is a method of separating an analyte from a sample fluid including the steps of (a) flowing the sample fluid through a series of fluidic channels, wherein the sample fluid includes the analyte; (b) flowing a buffer fluid through the series of fluidic channels; (c) crossing the sample fluid with the buffer fluid to allow exchange of molecules therebetween such that the analyte diffuses into the buffer fluid; and (d) collecting the analyte from the buffer fluid, wherein the sample fluid and the buffer fluid flow through the series of fluidic channels at a predetermined total flow rate.

In another embodiment, the crossing the sample fluid with the buffer fluid includes the steps of (a) carrying out at least about one lamination process cycle for both sample fluid and the buffer fluid in a first region of the series of fluidic channels, which includes a plurality of L-nodes connecting to each other in series; and (b) performing at least one reverse lamination process cycle for both sample fluid and the buffer fluid in a second region of the series of fluidic channels, which includes a plurality of R-nodes connecting to each other in series.

In yet another embodiment, further includes the step of passing the sample fluid through a sample inlet portion and passing the buffer fluid through a buffer inlet portion at an inlet flow distribution ratio in a range of 0.1-10, wherein the length ratio between the sample inlet portion and the buffer inlet portion is in ranged of 1:5-1:10.

The objects of the invention will become more fully apparent when the following detailed description of the invention is read in conjunction with the accompanying drawings.

BRIEF DESCRIPTION OF THE DRAWINGS

For a more complete understanding of the present invention, reference is made to the following detailed description and accompanying drawings, in which.

DETAILED DESCRIPTION OF THE PREFERRED EMBODIMENTS

As used herein and in the claims, "comprising" means including the following elements but not excluding others.

Figure 1:
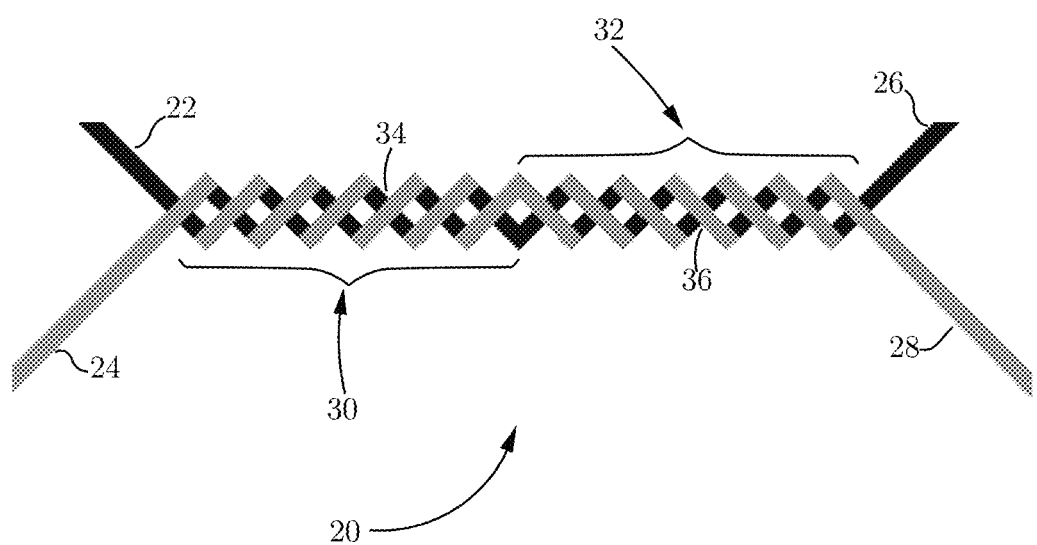
FIG. 1 is a schematic illustration of a microfluidic system in accordance with one embodiment of the present invention.

Referring to FIG. 1, a microfluidic system 20 for separating small molecules (analyte) from a sample fluid with large molecules therein including a sample inlet portion 22 for receiving the sample fluid having both small and large molecules therein, a buffer inlet portion 24 for receiving a buffer fluid, a waste outlet portion 26 and a recovery outlet portion 28. Connecting therebetween is a series of fluidic channels (microfluidic channels) comprising a plurality of L-nodes 34, which connect to each other in series thereby forming a lamination process cycle region 30 and a plurality of R-nodes 36, which connect to each other in series thereby forming a reverse lamination process cycle region 32. The last L-node 34 in the lamination process cycle region 30 is connected to the first R-node 36 in the reverse lamination process cycle region 32 at the connection between the lamination process cycle region 30 and the reverse lamination process cycle region 32, such that the lamination process cycle region 30 directly connects to the reverse lamination process cycle region 32. (Detail descriptions of the L-node 34 and the R-node 36 will be described in detail below.) There are seven L-nodes 34 in the lamination process cycle region 30 and seven R-nodes 36 in the reverse lamination process cycle region 32. Once the sample fluid and buffer fluid enter the sample inlet portion 22 and the buffer inlet portion 24, they split into different streams as they flow through the microfluidic system 20. For ease of description, these different streams of fluid are illustrated in the figures and text as streamlines, and names are given to the different streams to explain their flow paths. For example, the flow of the sample and buffer fluids once they enter the sample inlet is illustrated as multiple sample streamlines and buffer streamlines respectively. The length ratio between the sample inlet portion 22 and the buffer inlet portion 24 is 1:10 (i.e. 0.1) (i.e. the length of sample outlet portion:the length of buffer outlet portion). Further, the length of waste outlet portion 26 and the length of recovery outlet portion 28 has a ratio between 1:10 (i.e. 0.1) (i.e. the length of waste outlet portion 26:the length of recovery outlet portion 28). (Please note that the lengths of the sample inlet portion 22, buffer inlet portion 24, waste outlet portion 26 and recovery outlet portion 28 in FIG. 1 are not in scale). The sample inlet portion 22 and buffer inlet portion 24 are each connected to a positive displacement syringe pump to control an inlet flow distribution ratio (FD) (i.e the inlet flow rate of the sample fluid/inlet flow rate of the buffer fluid) and a total flow rate of the sample fluid and the buffer fluid (i.e. the flow rate of the sample fluid plus the flow rate of the buffer fluid).

The detail descriptions of the L-node 34 and R-node 36 are in the following paragraphs.

Figure 2:
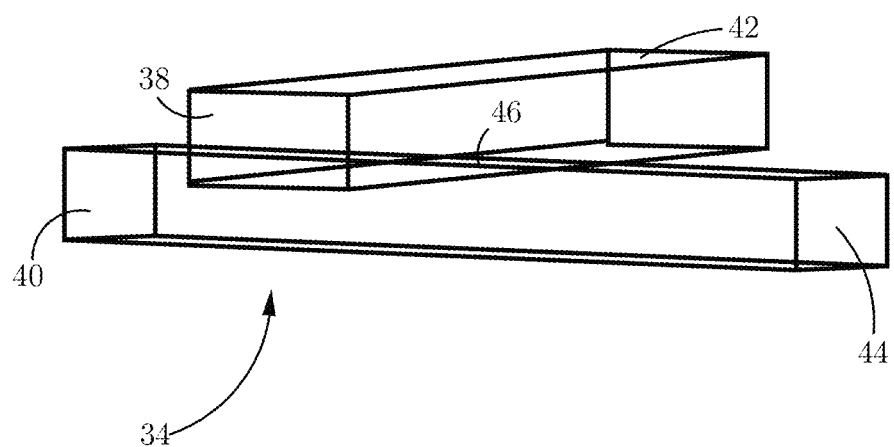
FIG. 2 is a schematic view of a L-node configuration module in accordance with the one embodiment of the present invention.
Figure 3:
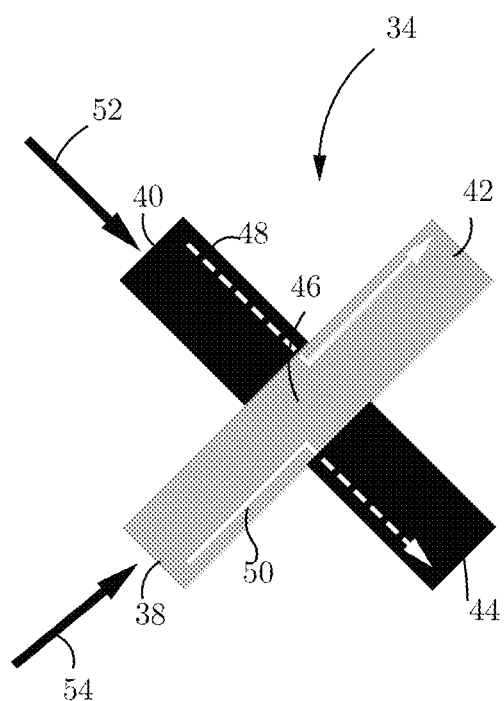
FIG. 3 is a schematic top view of a L-node configuration module in accordance with the one embodiment of the present invention.

Now referring to FIG. 2, the L-node 34 which includes an L-node upper channel and an L-node lower channel, where the L-node upper channel stacks over the L-node lower channel in a cross over configuration. At the intersection of the two channels, there is a L-node crossing layer 46 which provides a fluid connection between the L-node upper channel and the L-node lower channel. The L-node upper channel includes an upper entry port 38 and an upper exit port 42, while the L-node lower channel includes a lower entry port 40 and a lower exit port 44. FIG. 3 is a top view of the L-node 34, which the L-node upper channel is shown as gray in color and the L-node lower channel is shown as black in color. Further, a L-node lower fluid streamline 48 and a L-node upper fluid streamline 50 are shown in FIG. 3. The L-node lower fluid streamline 48 shows a flow path of at least one streamline (e.g. a portion of the fluid) of the fluid which enters the L-node 34 at the lower entry port 40. Similarly, the L-node upper fluid streamline 50 shows a flow path of at least one streamline (e.g. a portion of the fluid) of the fluid which enters the L-node 34 at the upper entry port 38. The remaining streamlines (e.g. remaining portion of the fluid) of the fluid which enters the L-node 34 at the lower entry port 40 and of the fluid which enters the L-node 34 at the upper entry port 38 continue to travel along the L-node lower channel and L-node upper channel respectively. The flow directions of the streamlines in the L-node lower channel and the streamlines in the L-node upper channel are represented by L-node lower channel flow direction 52 and L-node upper channel flow direction 54 respectively. The dotted portions of the streamlines (48 and 50) represent streamlines in the L-node lower channel while the solid portions of the streamlines (48 and 50) represent streamlines in the L-node upper channel. The L-node 34 steers the L-node lower fluid streamline 48 to the left-handed helical trajectories across the L-node crossing layer 46 in respect to the L-node lower channel flow direction 52.

In one specific embodiment, the angle between the axis along the length of the L-node upper channel and the axis along the length of the L-node lower channel is 90 degrees. Further, the L-node upper channel and the L-node lower channel are rectangular shaped and both have an uniform width and height along their lengths. The height of the L-node upper channel and the height of the L-node lower channel are both 20 μm. The width of the L-node upper channel and the width of the L-node lower channel are both 100 μm. As a result, the L-node upper channel aspect ratio and the L-node lower channel aspect ratio are both 20/100 (height of the channel/width of the channel)=0.2.

Figure 4:
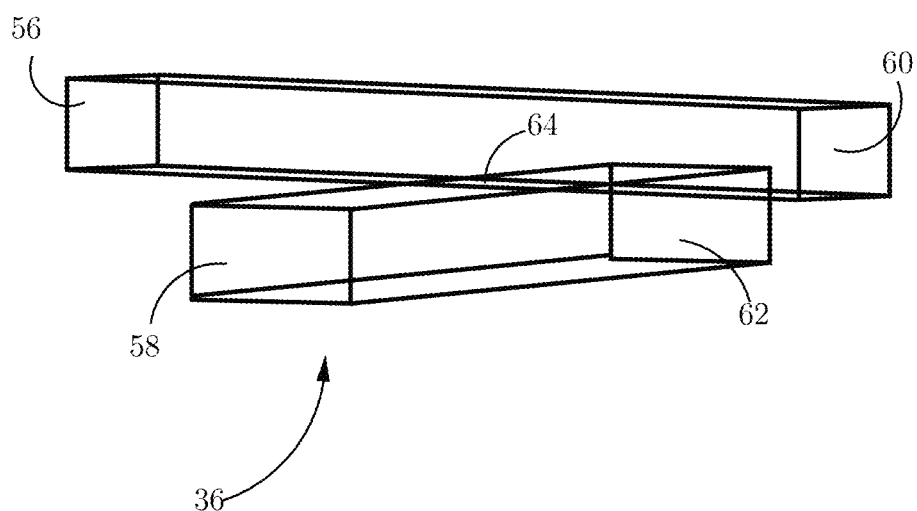
FIG. 4 is a schematic view of a R-node configuration module in accordance with the one embodiment of the present invention.
Figure 5:
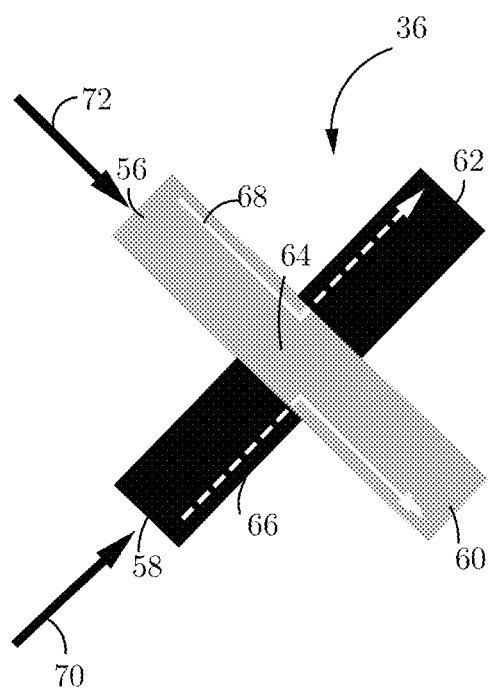
FIG. 5 is a schematic top view of a R-node configuration module in accordance with the one embodiment of the present invention.

Referring now to FIG. 4, the R-node 36 includes a R-node upper channel and a R-node lower channel, where the R-node upper channel stacks over the R-node lower channel in a cross over configuration. At the intersection of the two channels, there is a R-node crossing layer 64 which provides a fluid connection between the R-node upper channel and the R-node lower channel. The R-node upper channel includes an upper entry port 38 and an upper exit port 42, while the R-node lower channel includes a lower entry port 40 and a lower exit port 44. FIG. 5 is a top view of the R-node 36, which the R-node upper channel is shown as gray in color and the R-node lower channel is shown as black in color. Further, a R-node lower fluid streamline 66 and a R-node upper fluid streamline 68 are shown in FIG. 5.

The R-node lower fluid streamline 66 shows the flow path of at least one streamline (e.g. a portion of the fluid) of a fluid which enters the R-node 36 at the lower entry port 40. Similarly, the R-node upper fluid streamline 68 shows a flow path of at least one streamline (e.g. a portion of the fluid) of the fluid which enters the R-node 36 at the upper entry port 38. The remaining portion of the streamlines (e.g. remaining portion of the fluid) of the fluid which enters the R-node 36 at the lower entry port 40 and of the fluid which enters the R-node 36 at the upper entry port 38 continue to travel along the R-node lower channel and R-node upper channel respectively. The flow directions of the fluid flowing in the R-node lower channel and the fluid flowing in the R-node upper channel are represented by R-node lower channel flow direction 70 and R-node upper channel flow direction 72 respectively. The dotted portions of the streamlines (66 and 68) represent streamlines in the R-node lower channel while the solid portion of the streamlines (66 and 68) represent streamlines in the R-node upper channel. The R-node 36 steers the R-node lower fluid streamline 66 to the right-handed helical trajectories across the R-node crossing layer 64 in respect to the R-node lower channel flow direction 70.

In one specific embodiment, the angle between the axis along the length of the R-node upper channel and the axis along the length of the R-node lower channel is 90 degrees. Further, the R-node upper channel and the R-node lower channel are rectangular shaped and both have a uniform width and height along their lengths. The height of the R-node upper channel and the height of the R-node lower channel are both 20 µm. The width of the R-node upper channel and the width of the R-node lower channel are both 100 µm. As a result, the R-node upper channel aspect ratio and the R-node lower channel aspect ratio are both 20/100 (height of the channel/width of the channel)=0.2.

The connections/configurations among the sample inlet portion 22, buffer inlet portion 24, L-nodes 34, R-nodes 36, waste outlet portion 26 and recovery outlet portion 28 in the microfluidic system 20 are shown below.

The sample inlet portion 22 is connected to the lower entry port 40 of the first L-node 34 in the lamination process cycle region 30 while the buffer inlet portion 24 is connected to the upper entry port 38 of the first L-node 34 of the lamination process cycle region 30. In between the first L-node 34 and the last L-node 34 of the lamination process cycle region 30, the lower exit port 44 and the upper exit port 42 of the L-node 34 are respectively connected to the upper entry port 38 and the lower entry port 40 of the consecutive L-node 34 immediately thereafter. The lower exit port 44 and the upper exit port 42 of the last L-node 34 in the lamination process cycle region 30 are respectively connected to the lower inlet port 58 and the upper inlet port 56 of the first R-node 36 in the reverse lamination process cycle region 32.

In between the first R-node 36 and the last R-node 36 of the reverse lamination process cycle region 32, the lower outlet port 62 and the upper outlet port 60 of the R-node 36 are respectively connected to the upper inlet port 56 and the lower inlet port 58 of the consecutive R-node 36 immediately thereafter. The lower outlet port 62 and the upper outlet port 60 of the last R-node 36 in the reverse lamination process cycle region 32 are respectively connected to the waste outlet portion 26 and the recovery outlet portion 28.

Since the L-nodes 34 and the R-node 36 are connected in series as mentioned above, the L-node 34 and the R-nodes forms a linear array in the lamination process cycle region 30 and the reverse lamination process cycle region 32. In view of the above structure, splitting and recombination of fluidic streamlines are expected to take place among all crossing layers within the lamination process cycle region 30 and reverse lamination process cycle region 32.

Figure 6:
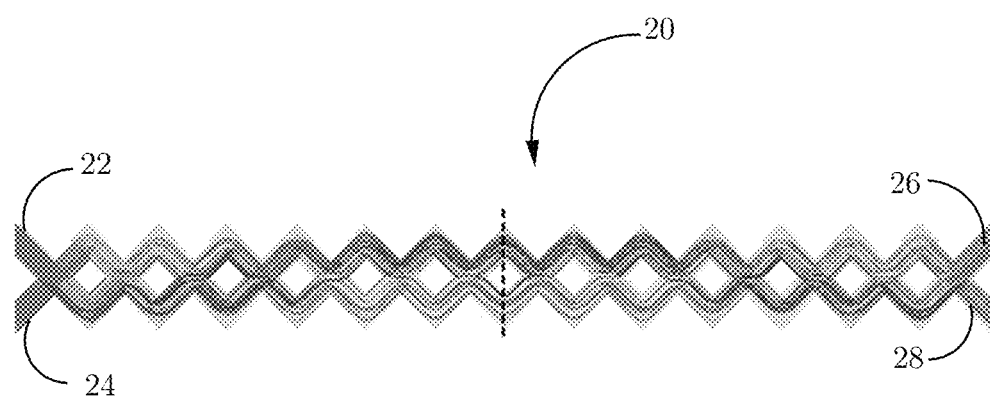
FIG. 6 shows the sample and buffer streamlines in a computer simulation in the microfluidic system according to the one embodiment of the present invention.

The velocity field and pressure profiles in the microfluidic system 20 was simulated by a commercial computational fluid dynamics package (FLUENT 6.0, Fluent Inc, Lebanon, N.H.) with meshes constructed by GAMBIT (FLUENT, Inc). The model was composed of grid patterns with ~1,000, 000 nodes. Microchannel cross section was simplified as regular rectangle with 100 µm in width and 20 µm in height, which were comparable to the actual device. Two Newtonian fluids of identical densities and viscosities were simulated as inlet solution. The standard Navier-Stokes equation with velocity-inlet and pressure-outlet boundary conditions was solved to determine the streamlines. Fluidic flows were assumed as steady-state laminar flows and no slip condition was imposed at all the boundaries. Twenty streamlines across each inlet were tracked using simulated particle injections. Convergence criterions of residual monitor for all quantities (continuity, x-, y-, z-flow velocity) were set to $10^{-5}$. The result of the simulation is shown in FIG. 6. The simulation showed that a majority of streamlines from buffer inlet portion 24 traversed from bottom to top after the lamination process cycle region 30. These buffer streamlines were rendezvous at the recovery outlet portion 28 after the reverse lamination process cycle region 32. The originally pitched buffer streamlines are spread across the entire microchannel (after lamination process cycle region 30) and retrieved at the recovery outlet portion 28 (after reverse lamination process cycle region 32). Furthermore, the sample streamlines are first spread through the lamination process cycle region 30 and reverse lamination process cycle region 32, and are recollected at the waste outlet portion 26 after the reverse lamination process cycle region 32.

Figure 7:
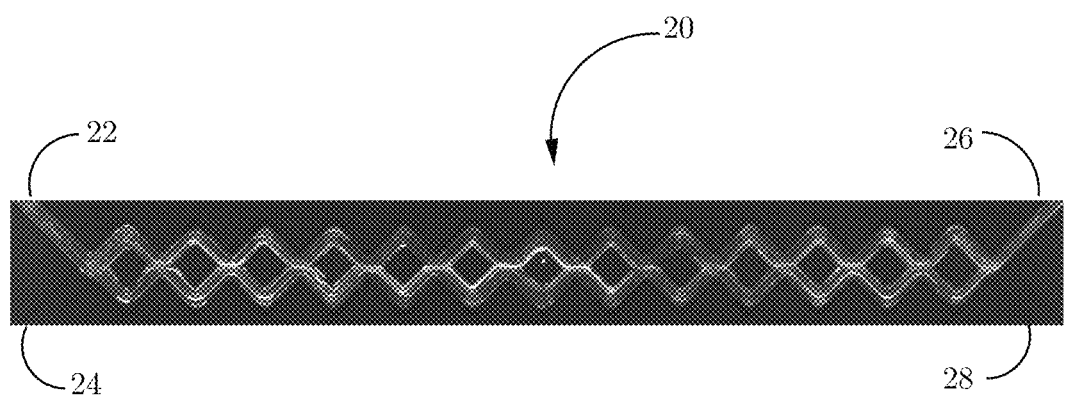
FIG. 7 shows the sample streamlines in the microfluidic system according to the one embodiment of the present invention.
Figure 8:
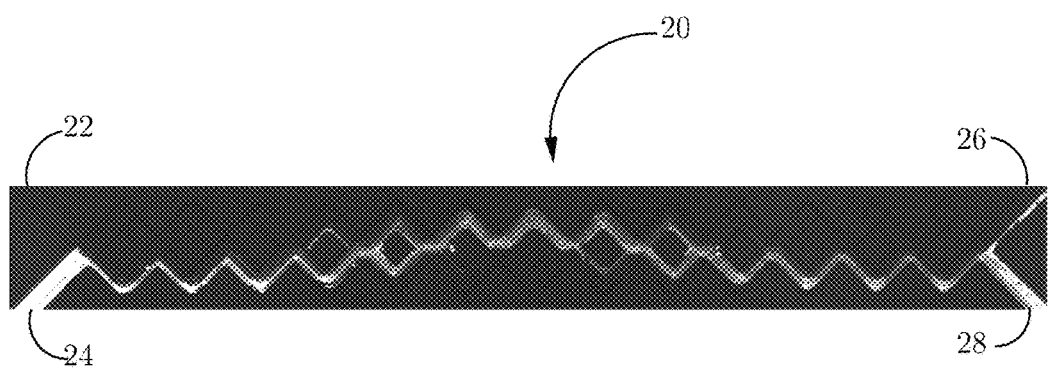
FIG. 8 shows the buffer streamlines in the microfluidic system according to the one embodiment of the present invention.
Figure 9:
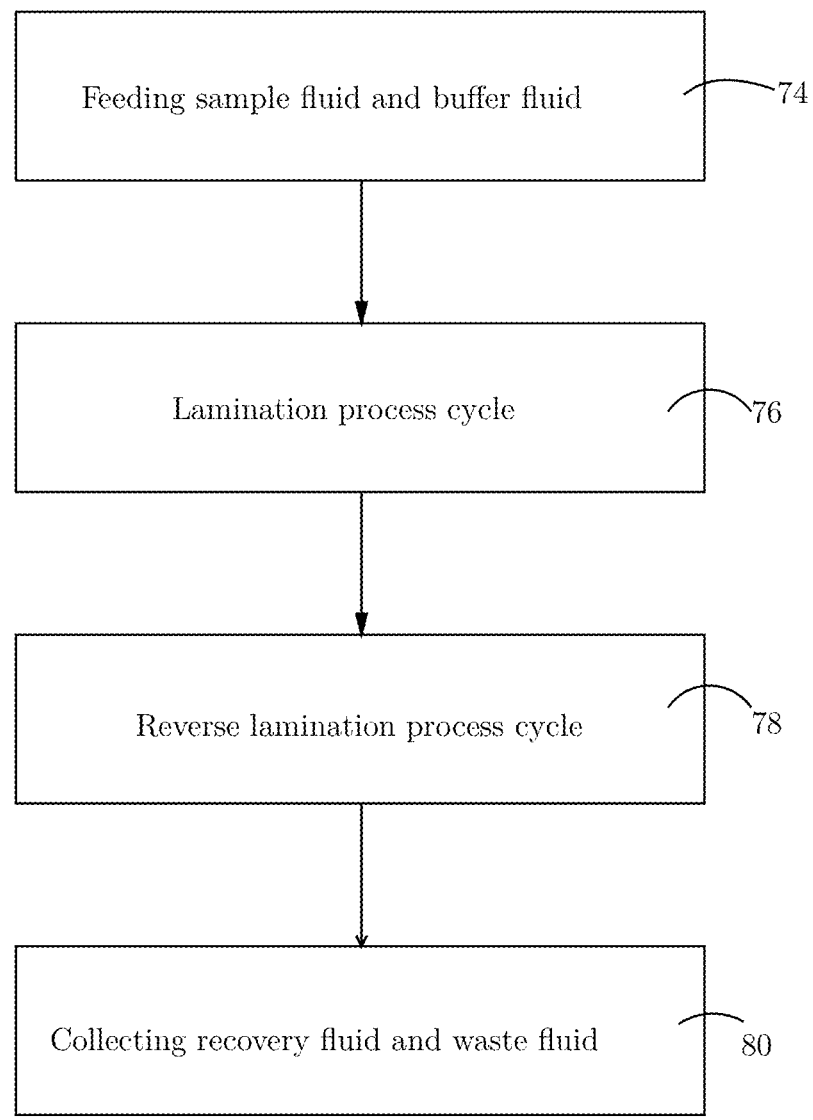
FIG. 9 is a process flow diagram of the microfluidic separation method in accordance with one embodiment of the present invention.

The sample and buffer streamlines in the microfluidic system 20 are shown in FIG. 7 and FIG. 8 respectively. In the FIGs, the fluorescence (2 µm fluorescent beads were used) showed the sample and buffer streamlines in the microfluidic system 20 at an inlet flow distribution ratio of 10 and a total flow rate of 110 µLh$^{-1}$. As shown in FIG. 7, the sample streamlines were recollected at the waste outlet portion 26 (97.7%±1.5%) after spread through the lamination process cycle region 30 and reverse lamination process cycle region 32 and the buffer streamlines were recollected at the recovery outlet portion 28 (92.7%±2.6%) as shown in FIG. 8. The originally pitched buffer streamlines were spread across the entire microchannel of 100 µm in width (after lamination process cycle region 30) and retrieved at recovery outlet portion 28 (after reverse lamination process cycle region 32). The minor buffer streamlines leaked to the waste outlet portion 26 which were due to imperfections in microfabrication and layer alignment processes. Further bifurcation law (that only applicable to particle entities) should have played a major role to the leak, where the flow rate in the waste outlet portion 26 was 10 times higher than that in the recovery outlet portion 28.

The results shown in FIG. 7 and FIG. 8 are comparable with the simulation result as shown in FIG. 6. Majority of streamlines from buffer inlet portion 24 traversed from bottom to top of the series of fluidic channels after the rendezvous from lamination process cycle region 30 were at the recovery outlet portion 28 after the reverse lamination process cycle region 32. Furthermore, the sample streamlines were first spread through the lamination process cycle region 30 and reverse lamination process cycle region 32, and were recollected at the waste outlet portion 26 after the reverse lamination process cycle region 32.

In one specific embodiment, the microfluidic system 20 is fabricated by molding polydimethylsiloxane (PDMS) against a printed circuit board (PCB) master. The procedure of such involved transferring photomask patterns on the photoresist of the PCB (Kinsten, Chiefskill, Taiwan) by UV irradiation followed by the removal of exposed photoresist, the etching of the unprotected copper layer and the casting of PDMS (RTV 615, GE Silicones, Waterford, N.Y., USA) on the PCB master. Negative replicas bearing channel feature (e.g. the series of microfluidic channels which comprises L-nodes 34 and R-nodes 36) (20×100 μm, Height× Width of each channels) were peeled off from the master and sealed by a dipping-attaching method after circular holes were punched through the top layer. The sample inlet portion 22 and the buffer inlet portion 24 are each connected to a positive displacement syringe pump. The overall dimension of the series of microfluidic channels is 3×2 cm (length× width). The lamination process cycle region 30 and the reverse lamination process cycle region 32 are evenly distributed along the series of microfluidic channels. Further, the L-nodes 34 are evenly distributed within the lamination process cycle region 30 and the R-nodes 36 are evenly distributed in the reverse lamination process cycle region 32. Furthermore, the lengths of the sample inlet portion 22 and the waste outlet portion 26 are 1 cm. The lengths of the buffer inlet portion 24 and the recovery outlet portion 28 are 10 cm.

Now refers to the microfluidic separation method. The microfluidic separation method separates small molecules (analyte) from the sample fluid, which also include large molecules. The method includes mainly four steps, namely, the step of feeding sample fluid and buffer fluid into the microfluidic system 20 (the feeding step) 74, the step of performing lamination process cycle 76, the step of reverse lamination process cycle 78, and the step of collecting recovery fluid and waste fluid (the collecting step) 80.

In the feeding step 74, the sample fluid, which includes the large and small molecules, is supplied to the lower entry port 40 of the first L-node 34 in the lamination process cycle region 30 through the sample inlet portion 22, which is connected to the lower entry port 40. Similarly, the buffer fluid is supplied to the upper entry port 38 of the first L-node 34 in the lamination process cycle region 30 through the buffer inlet portion 24 which is connected to the upper entry port 38. The total flow rate of the fluid flowing into the microfluidic system 20 is in a range of 110 μLh$^{-1}$ to 1300 μLh$^{-1}$. The inlet flow distribution ratio is controlled at 10. The inlet flow distribution ratio can be controlled by the first positive displacement syringe pump connected to the sample inlet portion 22 and the second positive displacement syringe pump connected to the buffer inlet portion 24. Alternatively, the inlet flow distribution ratio can be controlled by the ratio between the length of sample inlet portion 22 and the length of buffer inlet portion 24 when the flow rate of the sample fluid and the flow rate of the buffer fluid are not controlled by the positive displacement syringe pumps. Since a volumetric flow rate in a channel is inversely proportional to a fluidic resistance in the channel and the fluidic resistance the channel is proportion to the channel's length, the volumetric flow rate of the sample fluid in the sample inlet portion 22 and the volumetric flow rate of the buffer fluid in the buffer inlet portion 24 (provided that both sample inlet portion 22 and buffer inlet portion 24 are made of the same material) are controlled by the ratio between the length of sample inlet portion 22 and the length of buffer inlet portion 24. The inlet flow distribution ratio of 10 is achieved by setting the ratio between the length of sample inlet portion 22 and the length of buffer inlet portion 24 at 1:10. Similarly, the inlet flow distribution ratio of 0.6 is achieved by setting the ratio between the length of sample inlet portion 22 and the length of buffer inlet portion 24 at 10:6 (1.667) respectively. As seen above, the inlet flow distribution ratio equals to the reciprocal of the ratio between the length of sample inlet portion 22 and the length of buffer inlet portion 24.

After the feeding step 74, about/substantially one complete lamination process cycle 76 (i.e. 0.9-1.1 cycle) is carried out. The aforesaid is done by feeding the sample fluid and the buffer fluid into the series of L-nodes 34 in the lamination process cycle region 30 in the microfluidic system 20. Further, as the sample streamlines and the buffer streamlines pass through the L-nodes 34 in the lamination process cycle region 30, the sample streamlines and the buffer streamlines travel in each of the L-node 34 as described above. One complete lamination process cycle 76 is achieved when all the supply streamlines at the lower entry port 40 in the first L-node 34 of the lamination process cycle region 30 first travel back to the lower exit port 44 of the last L-node 34 of the series of L-nodes 34 in the lamination process cycle region 30. Similarly, the buffer streamlines at the upper entry port 38 in the first L-node 34 of the lamination process cycle region 30 also first travel back to the upper exit port 42 of the last L-node 34 of the series of L-nodes 34 in the lamination process cycle region 30. The about/substantially one complete lamination process cycle 76 is performed by passing the sample streamlines and the buffer streamlines through seven L-nodes in the lamination process cycle region 30 with using the L-nodes 34 having the aspect ratios as described above. The lamination process cycle 76 interlaces the buffer and sample streamlines to shorten the diffusion distance and increase the contact between each of the buffer streamlines and each of the sample streamlines. Since the average residence time of the large and small molecules within the sample streamlines in the microfluidic system 20 is the same, the mean diffusion distance for the large and small molecules are different. Under the same average residence time, the mean diffusion distance for the small molecules is generally larger than the mean diffusion distance of the large molecules. By reducing the distance between the buffer streamlines and the sample streamlines to a length that is between the mean diffusion distance of the large molecules and the mean diffusion distance of the small molecules, the small molecules can easily transfer/diffuse from the sample streamlines to the buffer streamlines, while only a smaller than average amount of large molecules manage to reach/diffuse the buffer streamlines. As such the small molecules are carried away by the buffer streamlines and separated from the sample streamlines with the large molecules due to the diffusion-biased among the large and small molecules.

In one specific embodiment, the lamination process cycle 76 is performed at a total flow rate of 1300 μLh$^{-1}$ with sample fluid including AlbuFITC and R110. At such flow rate, the average residence time of the microfluidic system 20 is about 0.04 seconds and the mean diffusion distance for AlbuFITC and R110 are 0.3 μm and 0.8 μm, respectively. Assuming the shortest distance between buffer and sample streamlines is 0.4 μm, R110 molecules can easily travel from sample to buffer streamlines while only a smaller-than-average amount of AlbuFITC molecules can manage to reach buffer streamlines within the average residence time. In this way, buffer streamlines will preferentially carry more R110 than AlbuFITC molecules when they rendezvous at the recovery outlet portion 28, just as the sample streamlines convectively transport towards the waste outlet portion 26.

About/substantially one complete reverse lamination process cycle 78 is carried out (i.e. 0.9-1.1 cycle) after the lamination process cycle 76. The reverse lamination process cycle 78 is performed in the series of R-nodes 36, which are located at the reverse lamination process cycle region 32. The sample streamlines from the lower exit port 44 of the last L-node 34 in the lamination process cycle region 30 is fed into the lower inlet port 58 of the first R-node 36 of the reverse lamination process cycle region 32 and the buffer streamlines from the upper exit port 42 of the last L-node 34 in the lamination process cycle region 30 is fed into the upper inlet port 56 of the first R-node 36 of the reverse lamination process cycle region 32. Further, the sample streamlines and the buffer streamlines pass through the R-nodes 36 in the reverse lamination process cycle region 32, they travel in each of the R-node 36 as described above. One complete reverse lamination process cycle 78 is achieved when all the sample streamlines at the lower inlet port 58 in the first R-node 36 of the reverse lamination process cycle region 32 first travel back to the lower outlet port 62 of the last R-node 36 of the series of R-nodes 36 in the reverse lamination process cycle region 32. Similarly, the buffer streamlines at the upper inlet port 56 in the first R-node 36 of the reverse lamination process cycle region 32 also first travel back to the upper outlet port 60 of the last R-node 36 of the series of R-nodes 36 in the reverse lamination process cycle region 32. The about/substantially one complete reverse lamination process cycle 78 is performed by passing the sample streamlines and the buffer streamlines through seven R-nodes in the reverse lamination process cycle region 32 with using the R-nodes 36 having the aspect ratios as described above.

In the collecting step 80, the recovery fluid which includes the separated small molecules and the buffer fluid is collected at the recovery outlet portion 28 while the waste fluid which includes the remaining sample fluid (i.e. sample fluid minus the separated small molecules) is collected at the waste outlet portion 26. The flow rate of the waste fluid and the flow rate of the recovery fluid is controlled to have an outlet flow distribution ratio (i.e. flow rate of the waste fluid/flow rate of the recovery fluid) at 10. Since a volumetric flow rate in a channel is inversely proportional to a fluidic resistance in the channel and the fluidic resistance the channel is proportion to the channel's length, the volumetric flow rate of the waste fluid in the waste outlet portion 26 and the volumetric flow rate of the recovery fluid in the recovery outlet portion 28 (provided that both waste outlet portion 26 and recovery outlet portion 28 are made of the same material) are controlled by the ratio between the length of waste outlet portion 26 and the length of recovery outlet portion 28. The outlet flow distribution ratio of 10 is achieved by setting the ratio between the length of waste outlet portion 26 and the length of recovery outlet portion 28 at 1:10. Similarly, the outlet flow distribution ratio of 5 is achieved by setting the ratio between the length of waste outlet portion 26 and the length of recovery outlet portion 28 at 1:5. As seen above, the outlet flow distribution ratio equals to the reciprocal of the ratio between the length of waste outlet portion 26 and the length of recovery outlet portion 28.

Recovery ratio (i.e. percentage recovery of small/large molecules) between small and large molecules at the recovery outlet portion 28 can be fine-tuned with different flow distribution ratios that is easily attainable by pumping different volumes of solution through the two inlets. By design, both the inlet flow distribution ratio and the outlet flow distribution ratio are set to 10. The default inlet flow distribution ratio 10 can be overridden by syringe pumps displacing constant flow volume. Since Newtonian fluid is incompressible, any inlet flow distribution ratio smaller than 10 indicates a decreased amount of sample streamlines entering the microfluidic system 20. With lesser amount of both small and large molecules but preferred recovery of small molecules, a high recovery ratio can be achieved by reducing inlet flow distribution ratio so that only negligible amount of large molecules can manage to reach the recovery outlet portion 28. For the same purpose, by applying a higher total flow rate, it will be more difficult for both small and large molecules to travel across streamlines.

Therefore, by tuning the flow distribution ratios configuration and/or the total flow rate, the microfluidic system 20 array can create a cut-off window to minimize the recovery of large molecules.

The separation system and the method separate the small molecules from the sample fluid with large molecules therein by diffusion-biased recovery of small molecules. Therefore, the separation method and the system thereof can perform separation in a continuous manner. Also separation at relatively high flow rate can be achieved.

EXAMPLES

Hereinafter, specific examples of the present invention will be described by way of Examples. However, the present invention is not limited to this.

Example 1

Materials and Reagents

Dye species were 2 µM of R110 (Rhodamine 110, R6479, Molecular Probes Inc., Eugene, Oreg., USA), 50 µM of DexRhoB (Rhodamine B isothiocyanate-Dextran, average mol wt ~10,000, R8881, Sigma) and 1.3 µM (on-chip analysis). All dye species were dissolved in dHBSS (Hank's balanced salt solution, 14175-095, Gibco, Carlsbad, Calif., USA) added with a working concentration of 0.1% DDM (n-Dodecyl β-Dmaltoside, D4641, Sigma) to minimize non-specific protein absorption.

Instrumentation and Data Analysis

For on-chip interrogation of dye species, sample fluid (Sample 1: AlbuFITC+DexRhoB, Sample 2: R110+ DexRhoB) and buffer fluid were injected into the microfluidic system 20 through the sample inlet portion 22 and the buffer inlet portion 24 respectively using two positive displacement syringe pumps while the waste outlet portion 26 and recovery outlet portion 28 were left open to the atmosphere. Micrographs were taken from an inverted fluorescence microscope equipped with a cooled CCD camera using 4× and 20× objectives. A fluorescence light source (X-Cite Series 120Q, Olympus, Japan) with filter set BP460-500, BP505-555 was used for R110 and AlbuFITC while filter set BP510-560, BP 583-658 was used for DexRhoB.

The sample and buffer solution were injected into the microfluidic system 20 by the volumetric flow rates as tabulated in Table 1 to reach different inlet flow distribution ratios (inlet FD). Each inlet FD configuration was continuously monitored to retrieve stabilized data (at least 120 seconds). Background and dye flooded images were retrieved by 120 seconds of washing with buffer solution, followed by another 120 seconds of filling the entire node array with dye species at the same total flow rate for a particular inlet FD configuration (either 325 µLh$^{-1}$ or 1300

μLh$^{-1}$). Background-corrected and normalized fluorescence intensity profiles were retrieved by ImageJ and the area integral of dye species at the recovery channel was analysed in Excel for percentage recovery calculation. A 4× objective was used to capture the entire node array for bead trajectories.

Results

The inlet flow distribution ratio (inlet FD) settings used are listed in Table 1 as shown below. Notice that the syringe pumps could only override the inlet flow distribution ratio while outlet flow distribution ratio at 10 was fixed. By varying inlet flow distribution ratio configuration from 0.1 to 10, the percentage recovery of different dye species (diffusion coefficient of R110, 10 kDa DexRhoB and AlbuFITC are 430 μm$^2$ s$^{-1}$, 130 μm$^2$ s$^{-1}$ and 61 μm$^2$ s$^{-1}$ respectively) at the recovery outlet portion 28 were shown at different total flow rates, 325 μLh$^{-1}$ in FIG. 10 and 1300 μLh$^{-1}$ in FIG. 11. It is noted that the inlet flow distribution ratio is denoted as FD in both FIG. 10 and FIG. 11. Since the majority amount of both species were delivered by the sample streamlines at high flow speed, negligible extent of diffusion-biased recovery was observed at the waste outlet portion 26 (data not shown).

TABLE 1

| Target inlet FD | Sample flow rate (μLh$^{-1}$) at total flow rate of 325 μLh$^{-1}$ (Re ~1) | Buffer flow rate (μLh$^{-1}$) at total flow rate of 325 μLh$^{-1}$ (Re ~1) | Sample flow rate (μLh$^{-1}$) at total flow rate of 1300 μLh$^{-1}$ (Re ~4) | Buffer flow rate (μLh$^{-1}$) at total flow rate of 1300 μLh$^{-1}$ (Re ~4) |
|---|---|---|---|---|
| 0.1 | 30 | 295 | 118 | 1182 |
| 0.2 | 54 | 271 | 217 | 1083 |
| 0.4 | 93 | 232 | 371 | 929 |
| 0.6 | 122 | 203 | 488 | 813 |
| 1 | 163 | 163 | 650 | 650 |
| 2 | 217 | 108 | 867 | 433 |
| 4 | 260 | 65 | 1040 | 260 |
| 10 | 295 | 30 | 1182 | 118 |

Figure 10:
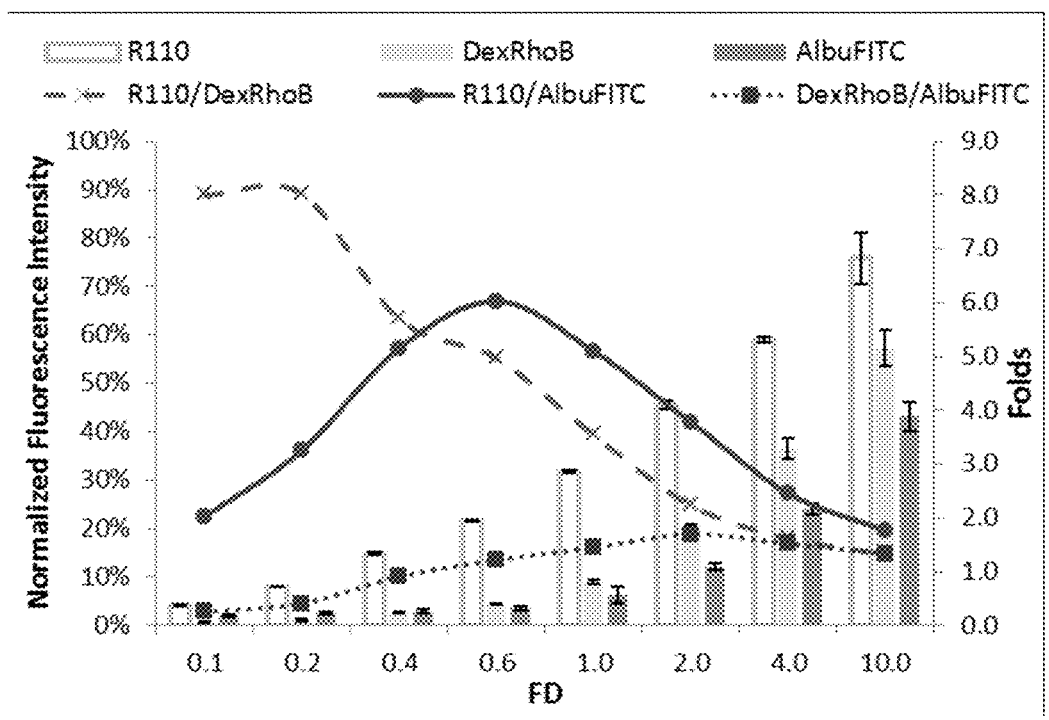
FIG. 10 shows a chart illustrating recovery of small molecules at various inlet flow distribution ratios at a total flow rate of 325 μLh$^{-1}$ according to Example 1.
Figure 12:
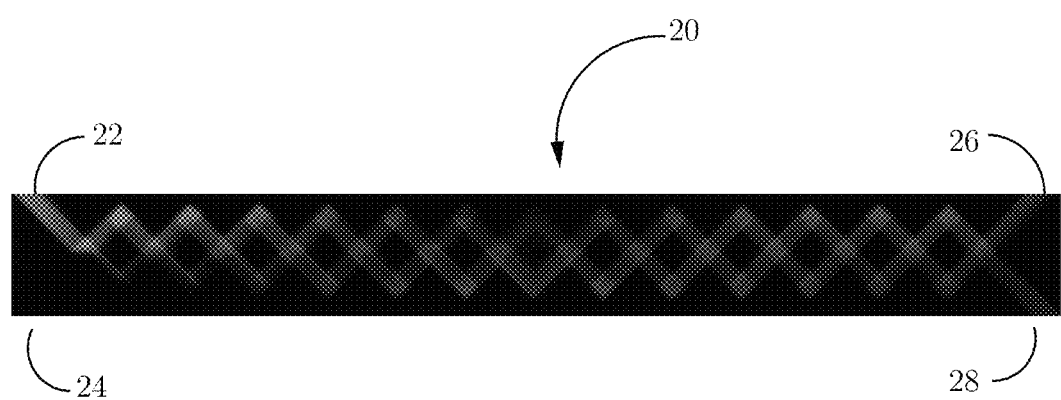
FIG. 12 shows an image illustrating the spatial distribution of R110 in the microfluidic system according to Example 1.
Figure 13:
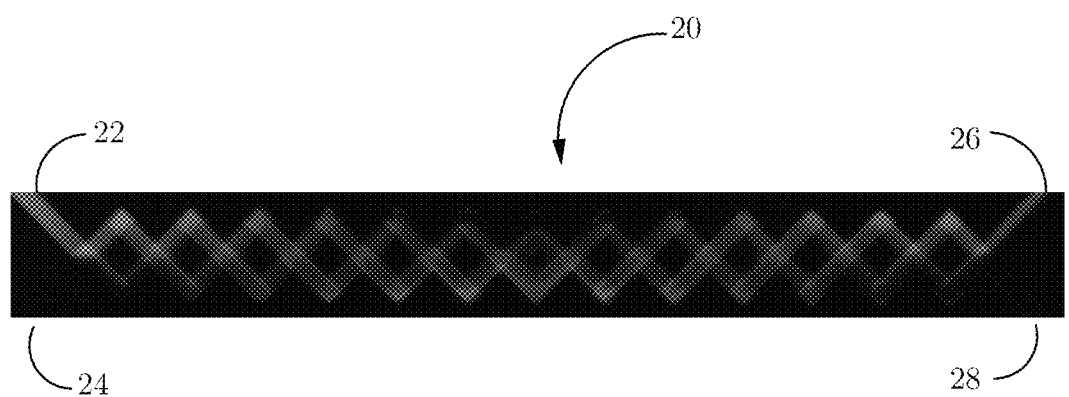
FIG. 13 shows an image illustrating the spatial distribution of AlbuFITC in the microfluidic system according to Example 1.

Starting from the default inlet flow distribution at 10, where streamlines trajectories was resemblance to FIG. 7 and FIG. 8, buffer streamlines were spread to contact with 10 times the amount of sample streamlines carrying dye species. FIG. 10 suggested that even the slowest diffusing AlbuFITC managed to have over 40 percentage recovery in this configuration. To create a more stringent cut-off window for larger molecules, either reducing inlet flow distribution or increasing total flow rate could be performed. Reducing inlet flow distribution decreased the relative amount of sample streamlines getting into the node array of the microfluidic system 20 such that the recovery of larger species could be suppressed. From the curve of R110/AlbuFITC in FIG. 10, recovery ratio (i.e. percentage recovery of small/large molecules) was maximized when inlet flow distribution of 0.6 was used, in which 21.7±0.2% of R110, 4.4±0.3% of DexRhoB and 3.6±0.4% of AlbuFITC were recovered. Pseudo-colored dye pattern of R110 and AlbuFITC captured at identical inlet flow distribution and total flow rate are shown in FIG. 12 and FIG. 13. From these fluorescence micrographs, an observable amount of R110 species was retrieved at the recovery outlet portion 28 while the recovery of AlbuFITC was barely noticeable. Likewise, the recovery ratio was maximized when FD-0.2 was used for the separation of R110 and DexRhoB.

Figure 11:
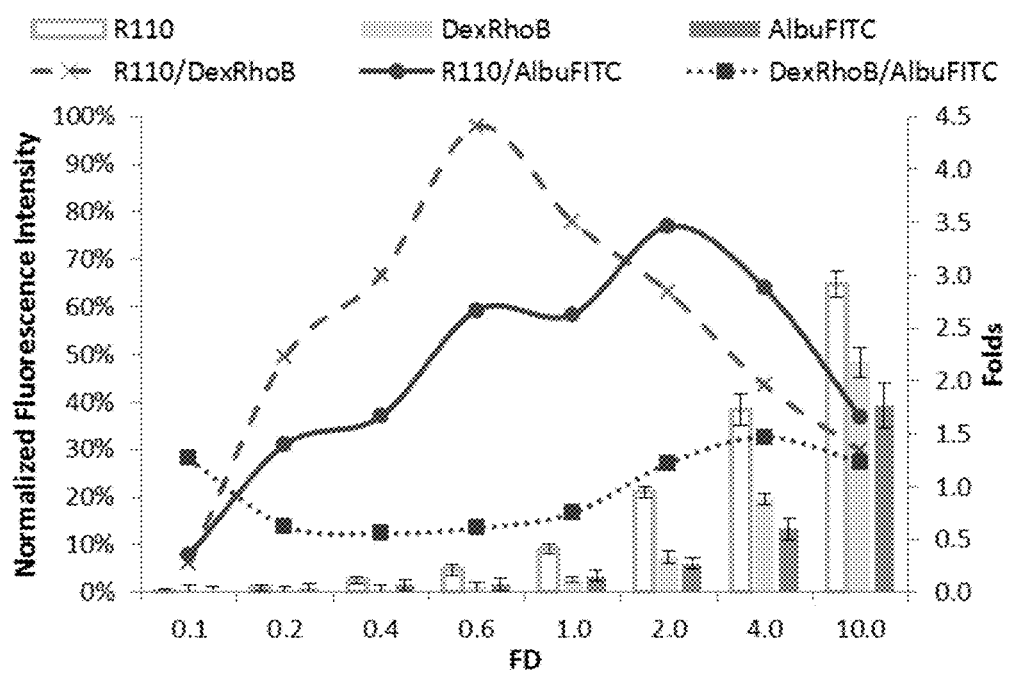
FIG. 11 shows a chart illustrating recovery of small molecules at various inlet flow distribution ratios at a total flow rate of 1300 μLh$^{-1}$ according to Example 1.

Since a cut-off window for large molecules can be also achieved by using a higher volumetric flow rate, we performed another set of experiments by increasing the total flow rate to 1300 μLh$^{-1}$ (the flow rate was chosen by the fact that even the fastest diffusing species, R110, was not recovered in inlet flow distribution at 0.1). As shown in FIG. 11, the optimal recovery between R110 and AlbuFITC shifted toward a higher inlet flow distribution at 2 and the recovery ratio was decreased to ~3.5 folds, albeit the total flow rate was increased by 4 times, which increased the solution throughput of the microfluidic system 20.

In each section and every flow configuration, at least replicated experiments were performed on individual replicas such that the error bars reflected the impact of misalignment among replicas.

Example 2

Example 2 demonstrates the separation of small molecule drugs from a protein solution. This sample fluid consisted of a well-known antimalarial drug, quinine (diffusion coefficient: 480 μm$^2$ s$^{-1}$) together with albumin (commonly found protein in blood plasma) conjugated with FITC, i.e. AlbuFITC. For simplicity, this model sample eliminated the impact of drug-protein binding by using an excess concentration of quinine.

Materials and Reagents: Dye species were 0.72 mM of quinine (6119-70-6, Aladdin Reagents, Shanghai, China) and 6 μM of AlbuFITC (Albumin-fluorescein isothiocyanate conjugate, A9771, Sigma). All dye species were dissolved in dHBSS (Hank's balanced salt solution, 14175-095, Gibco, Carlsbad, Calif., USA) added with a working concentration of 0.1% DDM (n-Dodecyl β-Dmaltoside, D4641, Sigma) to minimize non-specific protein absorption.

Each microfluidic system 20 was secured in a homemade humidity chamber to minimize evaporation of solution retrieved at the outlets. First, the device was allowed to wash for 20 minutes using the buffer solution, and a sample fluid of quinine and AlbuFITC was injected with buffer solution according to inlet FD-0.6 configuration at a total flow rate of 325 μLh$^{-1}$ (the highest recovery ratio was achieved in accordance with FIG. 10, diffusion coefficient of quinine and R110 are similar). The microfluidic system 20 was allowed to run continuously for another 45 minutes and aliquots were retrieved from the waste outlet portion 26 and recovery outlet portion 28 at 15 minutes intervals for off-chip spectrophotometric analysis using NanoVue Plus (GE Healthcare, UK) to determine the concentration of quinine and AlbuFITC.

The spectrophotometric analysis is described below. First, absorption spectrums for quinine and AlbuFITC were retrieved by scanning an absorbance ranging from 200 to 900 nm. Characteristic peaks for quinine and AlbuFITC were identified as 230 nm and 500 nm (absorbance of FITC), respectively. Calibration curves with $R^2$ over 0.99 for pure quinine and AlbuFITC at different concentrations were established by monitoring the absorbance at the characteristic peaks. The concentration of quinine and AlbuFITC were calculated based on the calibration curves and the corresponding contribution of each species at the characteristic absorbance. Triplicated experiments were performed on 3 individual microdevices. The stability of off-chip percentage recovery over time was evaluated by collecting aliquots from both the waste and recovery outlet portions at 15-min intervals after the outlet vials were washed by buffer fluid for 20 minutes. After taking aliquots at each time point, excessive solution on both outlets was carefully removed to avoid potential contamination to next time point. Aliquots were stored within small PCR tubes to avoid evaporation and measurements were conducted after all aliquots were retrieved. In consistent with onchip interrogation, the diffusion-biased recovery of species from waste outlet portion 26 was negligible so only the results from recovery outlet portion 28 were plotted and is shown in FIG. 14.

In each section and every flow configuration, at least replicated experiments were performed on individual replicas such that the error bars reflected the impact of misalignment among replicas.

Figure 14:
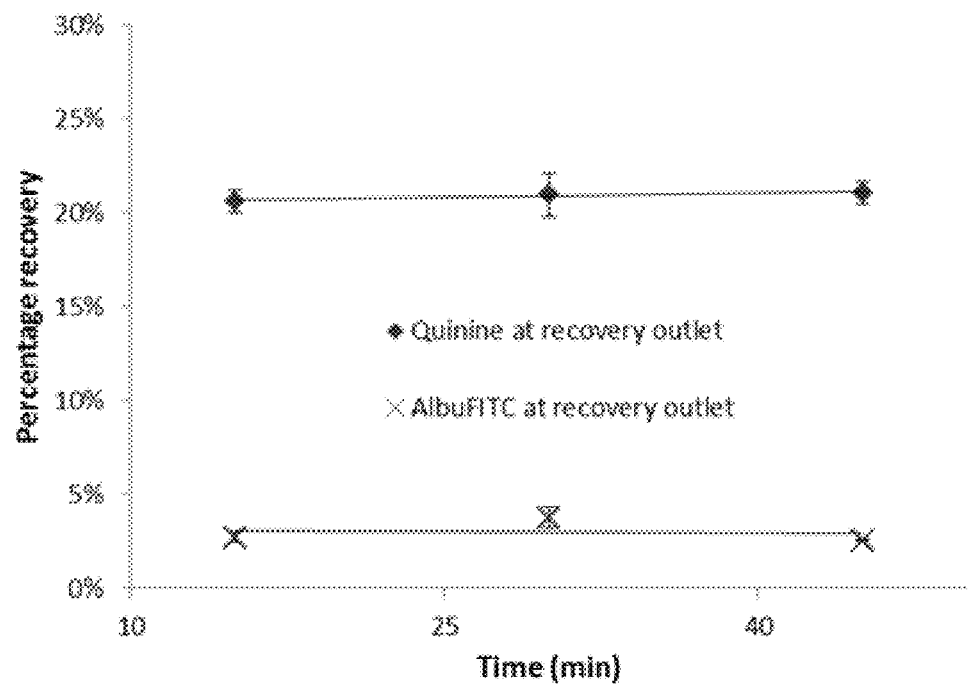
FIG. 14 shows a plotted graph illustrating the results from recovery outlet according to Example 2.

As shown in FIG. 14, the percentage recovery of quinine and AlbuFITC were 21.3±1.4%, 3.0± and 0.6% respectively. These values were stable over the entire period of time and the percentage recovery of AlbuFITC was comparable with on-chip result retrieved in identical conditions.

In another embodiment of the present invention, the positions of lamination process cycle region 30 and reverse lamination process cycle region 32 are interchanged within the series of fluidic channels (microfluidic channels). The reverse lamination process cycle region 32 is connected to the sample inlet portion 22 and the buffer inlet portion 24. Similarly, the lamination process cycle region 30 is connected to the waste outlet portion 26 and recovery outlet portion 28. In this embodiment, the simple inlet portion and the buffer inlet portion 24 are connected to the lower inlet port 58 and upper inlet port 56 of the first R-node 36 of the reverse lamination process cycle region 32 respectively. Similarly, the recovery outlet portion 28 and the waste outlet portion 26 are connected to the lower exit portion and the upper exit portion of the last L-node 34 of the lamination process cycle region 30 respectively. The lower outlet portion and the upper outlet portion of the last R-node 36 in the reverse lamination process cycle region 32 is respectively connected to the lower entry portion and the upper entry portion of the first L-node 34 in the lamination process cycle region 30. In this case, as the sample streamlines and the buffer streamlines first travel through the reverse lamination process cycle region 32 to perform about/substantially one complete reverse lamination process cycle 78 (i.e. 0.9-1.1 cycle). The sample streamlines and the buffer streamlines further travel through the lamination process cycle region 30 to achieve about/substantially one complete lamination process cycle 76 (i.e. 0.9-1.1 cycle). Therefore, the reverse lamination process cycle 78 is performed before the lamination process cycle 76.

In yet another embodiment of the present invention, at least two pairs of lamination process cycle region 30 and reverse lamination process cycle region 32 pair are used in the series of fluidic channels (i.e. two lamination process cycle regions 30 and two reverse lamination process cycle regions 32). In one specific embodiment of the present invention, two pairs of lamination process cycle region 30 and reverse lamination process cycle region 32 pair are used in the series of fluidic channels. Random order of the two lamination process cycle regions 30 and two reverse lamination process cycle regions 32 in the series of fluidic channels can be used. The lamination process cycle regions 30 and reverse lamination process cycle regions 32 are connected to each other in the similar manner as described above.

For example, in one particular arrangement, the first region in the series of fluidic channels is a first lamination process cycle region 30 followed by a first reverse lamination process cycle region 32 and then a second lamination process cycle region 30 and lastly followed by a second reverse lamination process cycle region 32. The first lamination process cycle 76 is connected to the sample inlet portion 22 and buffer inlet portion 24 while the second reverse lamination process cycle region 32 is connected to the waste outlet portion 26 and the recovery outlet portion 28. About/substantially one complete cycle (i.e. 0.9-1.1. cycle) is performed in each lamination process cycle region 30 and 32. There are seven L-nodes 34 for each lamination process cycle regions 30 and seven R-nodes 36 for each reverse lamination process cycle regions 32.

In yet another particular arrangement, the first region in the series of fluidic channels is a first lamination process cycle region 30 followed by a first reverse lamination process cycle region 32 and then a second reverse lamination process cycle region 32 and lastly followed by a second lamination process cycle region 30. The first lamination process cycle 76 is connected to the sample inlet portion 22 and buffer inlet portion 24 while the second lamination process cycle region 30 is connected to the waste outlet portion 26 and the recovery outlet portion 28. About/substantially one complete cycle (i.e. 0.9-1.1. cycle) is performed in each lamination process cycle region 30 and 32. There are seven L-nodes 34 for each lamination process cycle regions 30 and seven R-nodes 36 for each reverse lamination process cycle regions 32.

In yet another particular arrangement, the first region in the series of fluidic channels is a first lamination process cycle region 30 followed by a second lamination process cycle region 30 and then a first reverse lamination process cycle region 32 and lastly followed by a second reverse lamination process cycle region 32. The first lamination process cycle 76 is connected to the sample inlet portion 22 and buffer inlet portion 24 while the second reverse lamination process cycle region 32 is connected to the waste outlet portion 26 and the recovery outlet portion 28. About/substantially one complete cycle (i.e. 0.9-1.1. cycle) is performed in each lamination process cycle region 30 and 32. There are seven L-nodes 34 for each lamination process cycle regions 30 and seven R-nodes 36 for each reverse lamination process cycle regions 32.

Therefore, the order and the number of lamination process cycle regions 30 and reverse lamination process cycle regions 32 can be varied based on the arrangement and the number of the lamination process cycle regions 30 and reverse lamination process cycle regions 32 in the series of fluidic channels.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown in the accompanying drawing figures shall be interpreted as illustrative only and not in a limiting sense.

For example, the length ratio between the sample inlet portion 22 and buffer inlet portion 24 can be varied. The same applies to the length ratio between the waste outlet portion 26 and recovery outlet portion 28. The ranges for the aforesaid length ratios are from 1:10-1:5. In particular to the length ratio between the sample inlet portion 22 and buffer inlet portion 24, the length ratio for such can be 1:1 (i.e. same length). The length of the sample inlet portion 22, buffer inlet portion 24, waste outlet portion 26 and recovery outlet portion 28 are in the order of centimeter. The numbers of the L-nodes 34 in the lamination process cycle region 30 can be more or less than seven. In particular, the numbers of the L-nodes 34 is of multiple of seven. Similarly, The numbers of the R-nodes 36 in the reverse lamination process cycle region 32 can be more or less than seven. In particular, the numbers of the R-nodes 36 is of multiple of seven. The number of L-nodes 34 required for lamination process cycle region 30 to perform about/substantially one lamination process cycle 76 depends on the aspect ratios of the L-node lower channel and L-node upper channel in each of the L-nodes 34. Similarly, the number of R-nodes 36 required for reverse lamination process cycle region to perform about/substantially one reverse lamination process cycle 78 depends on the aspect ratios of the R-node lower channel and R-node upper channel in each of the R-nodes 36. For both L-node 34 and R-node 36, the angle between the upper channel and the lower channel can be varied. Similarly, the channels' shapes, heights and widths of the channels of the L-node 34 and the R-node 36 can be varied. Particularly, the channels' shapes of the L-node 34 and R-node 36 can be in cylindrical shaped. In one embodiment, the height of the channels of each L-node 34 and node is in a range of 10 to 35 μm. Further, the aspect ratios of the L-node lower channel and L-node upper channel in each of the L-nodes 34 can be varied. Similarly, the aspect ratios of the R-node lower channel and R-node upper channel in each of the R-nodes 36 can also be varied. The aspect ratios of the aforesaid are all in a range of 0.1-0.35. Further, the overall dimension of the series of microfluidic channels can be varied. Also, the dimensions of each of the L-nodes 34 and each of the R-nodes 36 can be varied. The width and the height of the channels of the L-nodes 34 and R-nodes 36 are in the order of micrometer (i.e. μm).

Furthermore, the inlet and/or outlet flow distribution ratio can be varied. In particular, the inlet and/or outlet flow distribution ratio can be higher than 10. Similarly, the inlet and/or outlet flow distribution ratio can be lower than 10. Also the total flow rate can be higher than 1,300 μLh$^{-1}$ as long as the material of the channels in the microfluidic system 20 does not deformed during operation or the microfluidic separation method.

Moreover, multiple of about one cycle (e.g. 1-30 cycles) can be performed in a single lamination process cycle region 30 and multiple of about one cycle (e.g. 1-30 cycles) can be performed in a single reverse process cycle region. It is essential that the number of cycles run in the lamination process cycle region 30 equals or substantially equals to the number of cycles run in the reverse lamination process cycle region 32. The number of L-nodes 34 in each lamination process cycle region 30 depends on the number of cycles to be run in the lamination process cycle region 30. Similarly, the number of R-nodes 36 in each reverse lamination process cycle region 32 depends on the number of cycles to be run in the reverse lamination process cycle region 32.

The following claims should not be read as limited to the described order or elements unless stated to that effect. Therefore, all statements of the scope of the invention which, as a matter of language, might be said to fall therebetween.

What is claimed:

1. A method of separating an analyte from a sample fluid comprising:
    flowing said sample fluid at a first flow rate to a sample inlet portion of a microfluidic system that includes an upper channel and a lower channel crossing with each other, wherein said sample fluid comprises said analyte and species;
    flowing a buffer fluid at a second flow rate to a buffer inlet portion of the microfluidic system;
    controlling a distance between the buffer fluid and the sample fluid inside the microfluidic system to a length that is shorter than a mean diffusion distance of the analyte and longer than a mean diffusion distance of the species in the sample fluid;
    crossing said sample fluid with said buffer fluid to said length of distance to allow exchange of molecules therebetween such that said analyte diffuses into said buffer fluid; and
    collecting said analyte from said buffer fluid,
    wherein said first flow rate and said second flow rate are different.

2. The method of claim 1, wherein said crossing sample fluid with said buffer fluid comprises:
    carrying out at least one lamination process cycle for said sample fluid and said buffer fluid in a first region of said series of fluidic channels, which comprises a plurality of L-nodes connecting to each other in series; and
    performing at least one reverse lamination process cycle for said sample fluid and said buffer fluid in a second region of said series of fluidic channels, which comprises a plurality of R-nodes connecting to each other in series.

3. The method of claim 2, wherein said first region is directly connected to said second region; and one lamination process cycle is carried out in said first region and one reverse lamination process cycle is carried in said second region.

4. The method of claim 2, wherein each of said L-nodes has a L-node upper channel and a L-node lower channel; and each of said R-nodes has a R-node upper channel and a R-node lower channel, and wherein each of said L-node upper channels, L-node lower channels, R-node upper channels and R-node lower channels has an aspect ratio in a range of 0.1-0.3.

5. The method of claim 4, wherein each of said L-node upper channels, L-node lower channels, R-node upper channels and R-node lower channels has a height of 20 μm and a width of 100 μm, and wherein said first region has seven L-nodes and said second region has seven R-nodes.

6. The method of claim 2 further comprises:
    passing said sample fluid through the sample inlet portion and passing said buffer fluid through the buffer inlet portion at an inlet flow distribution ratio in a range of 0.1-10, wherein the length ratio between said sample inlet portion and said buffer inlet portion is 1:1.

7. The method of claim 2 further comprises:
    passing said sample fluid through the sample inlet portion and passing said buffer fluid through the buffer inlet portion at an inlet flow distribution ratio in a range of 0.1-10, wherein the length ratio between said sample inlet portion and said buffer inlet portion is in a range of 1:5-1:10.

8. The method of claim 2 further comprises:
    collecting said analyte with said buffer fluid at a recovery outlet portion and collecting a remaining sample fluid at a waste outlet portion, wherein the length ratio between said waste outlet portion and said recovery outlet portion is in a range of 1:5-1:10.

9. The method of claim 8, wherein said length ratio between said waste outlet portion and said recovery outlet portion is 1:10, such that an outlet flow distribution ratio is 10.

10. The method of claim 2 wherein said total flow rate of said sample fluid and said buffer fluid into said series of fluidic channels is in a range of 110 μLh$^{-1}$-1300 μLh$^{-1}$.

11. The method of claim 1, wherein said first flow rate is controlled by a first positive displacement syringe pump and said second flow rate is controlled by a second positive displacement syringe pump.

* * * * *